United States Patent
Hsieh et al.

(10) Patent No.: US 7,593,779 B2
(45) Date of Patent: Sep. 22, 2009

(54) CONTROL DEVICE WITH TWO PROCESSORS

(75) Inventors: Tony Hsieh, Taoyuan (TW); David Chen, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 723 days.

(21) Appl. No.: 11/235,268

(22) Filed: Sep. 27, 2005

(65) Prior Publication Data

US 2007/0050049 A1 Mar. 1, 2007

(30) Foreign Application Priority Data

Aug. 24, 2005 (TW) .............................. 94129010 A

(51) Int. Cl.
  *G05B 19/18* (2006.01)
  *G06F 19/00* (2006.01)
  *G05B 19/04* (2006.01)
(52) U.S. Cl. ...................... 700/2; 700/249; 700/169
(58) Field of Classification Search .................. 700/2, 700/4, 20, 21, 40, 249, 169
See application file for complete search history.

(56) References Cited

U.S. PATENT DOCUMENTS

| | | | | |
|---|---|---|---|---|
| 5,481,649 A | * | 1/1996 | Birdwell et al. | 706/59 |
| 5,692,121 A | * | 11/1997 | Bozso et al. | 714/13 |
| 5,963,979 A | * | 10/1999 | Inoue | 711/162 |
| 6,065,135 A | * | 5/2000 | Marshall et al. | 714/11 |
| 6,173,416 B1 | * | 1/2001 | Liddell et al. | 714/11 |
| 6,263,452 B1 | * | 7/2001 | Jewett et al. | 714/9 |
| 6,694,449 B2 | * | 2/2004 | Ghameshlu et al. | 714/11 |

* cited by examiner

*Primary Examiner*—Thomas K. Pham

(57) ABSTRACT

A control device with two processors includes: a circuit substrate; a first central processing unit disposed on the circuit substrate to receive a control signal for controlling the operation of a first device; a second central processing unit disposed on the circuit substrate to receive a control signal for controlling the operation of a second device; and a first communication circuit disposed between the first central processing unit and the second central processing unit for providing communications between them. The first central processing unit further processes the kernel control software and peripheral software of the first device and the peripheral software of an air conditioner. The second central processing unit further processes the peripheral software of the first device and the peripheral software of the first device in order to respectively control the operations of the first and second devices.

12 Claims, 2 Drawing Sheets

CONTROL DEVICE WITH TWO PROCESSORS

This Non-provisional application claims priority under 35 U.S.C. § 119(a) on Patent Application No(s). 094129010 filed in Taiwan on Aug. 24, 2005, the entire contents of which are hereby incorporated by reference.

BACKGROUND OF THE INVENTION

1. Field of Invention

The invention relates to a control device of the heating ventilation air conditioning (HVAC) system and, in particular, to a HVAC system control device with two processors.

2. Related Art

With the development of heating ventilation air conditioning (HVAC) industry, high-rise buildings, department stores, factories, and hotels use HVAC systems to adjust indoor temperature for a more comfortable environment. The HVAC systems include inverters and air conditioners. By detecting the ambient temperature and moisture, the operations of the Inverters and air conditioner are controlled accordingly. However, manufacturers of the Inverters and air conditioners often over-complicate the control method of the HVAC systems in fear of the problems that their kernel techniques may be released, the control software is difficult to integrate, and the integration cost is too high.

Currently, most of the HVAC system control devices use their own control circuit board (that is, the Inverters and the air conditioners are independently controlled). Therefore, there are drawbacks such as larger circuit sizes and higher manufacturing costs. Communications and control of the two control circuits are done via an external communication circuit (e.g., the RS-232 port). In addition to a longer communication path, it is also susceptible to noises. In the worst case, it may cause the devices to act incorrectly.

FIG. 1 shows a system block diagram of the currently used control device for HVAC systems. The Inverter processor 1a is disposed on the circuit board 1 and communicates with the air conditioner processor 2a disposed on the circuit substrate 2 via the external communication circuit 3. The Inverter processor 1a and the air conditioner processor 2a process respectively dedicated kernel control software, peripheral software, and system software in order to control the Inverter and the air conditioner (not shown). For the convenience of illustration, other circuit blocks on the circuit board 1 and the circuit substrate 2 are not drawn.

Therefore, how to provide a control device that integrates the two processors at a lower cost is an important issue.

SUMMARY OF THE INVENTION

In view of the foregoing, an objective of the invention is to provide a control device with two processors. The processors for a first device and a second device along with the corresponding control software are integrated with peripheral circuits on the same circuit substrate. The invention can reduce the size of the control device and lower the production cost.

To achieve the above objective, the disclosed HVAC system control device with two processors includes: a first central processing unit (CPU), a second CPU, a first communication circuit, a second communication circuit, a power source driver, a first reset circuit, a second reset circuit, a command input circuit, an operation status displaying circuit, a sensor circuit, and a peripheral circuit.

The first CPU receives a control signal for controlling the operation of the first device and processes related control software and peripheral software.

The second CPU receives a control signal for controlling the operation of the second device and processes related control software and peripheral software.

The first communication circuit enables the first CPU and the second CPU to communicate. The first communication circuit includes an isolated synchronous/asynchronous serial communication port, a photo coupler, a fiber circuit or isolated transformer.

The second communication circuit enables the first CPU and the second CPU to communicate with external devices (e.g., a remote computer) for processing remote controls.

The power source driver converts the power supply specification (e.g., AC/DC conversion) to provide the power required for the operation of the first CPU.

The first reset circuit is coupled to the first CPU to generate a reset signal for initializing the operation status of the first CPU.

The second reset circuit is coupled to the second CPU to generate a reset signal for initializing the operation status of the second CPU.

The command input circuit is used to enter an operation control command and generate a corresponding control signal for controlling the operations of the first and second devices.

The operation status displaying circuit is used to display the operation statuses or disorder messages of the first and second devices. The operation status displaying circuit may consist of light-emitting diodes (LED's), a seven-stroke display, a liquid crystal display (LCD), and their driver circuits.

The sensor circuit is used to detect the operation statuses of the first and second devices and the temperature and moisture of the environment, and generates a corresponding detection signal.

The peripheral circuit controls the first CPU and the second CPU, converts the detection signal, and processes inputs and outputs. It includes an analog-to-digital converter (ADC), a digital-to-analog converter (DAC), an input/output (I/O) port, a timer, and a counter.

Using the disclosed control device with two processors, the processors of the first and second devices and the peripheral circuit are integrated on the same circuit substrate. It controls the operations of the first device and the second device using the corresponding control software. The invention can reduce the circuit size of the control device and reduce the production cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
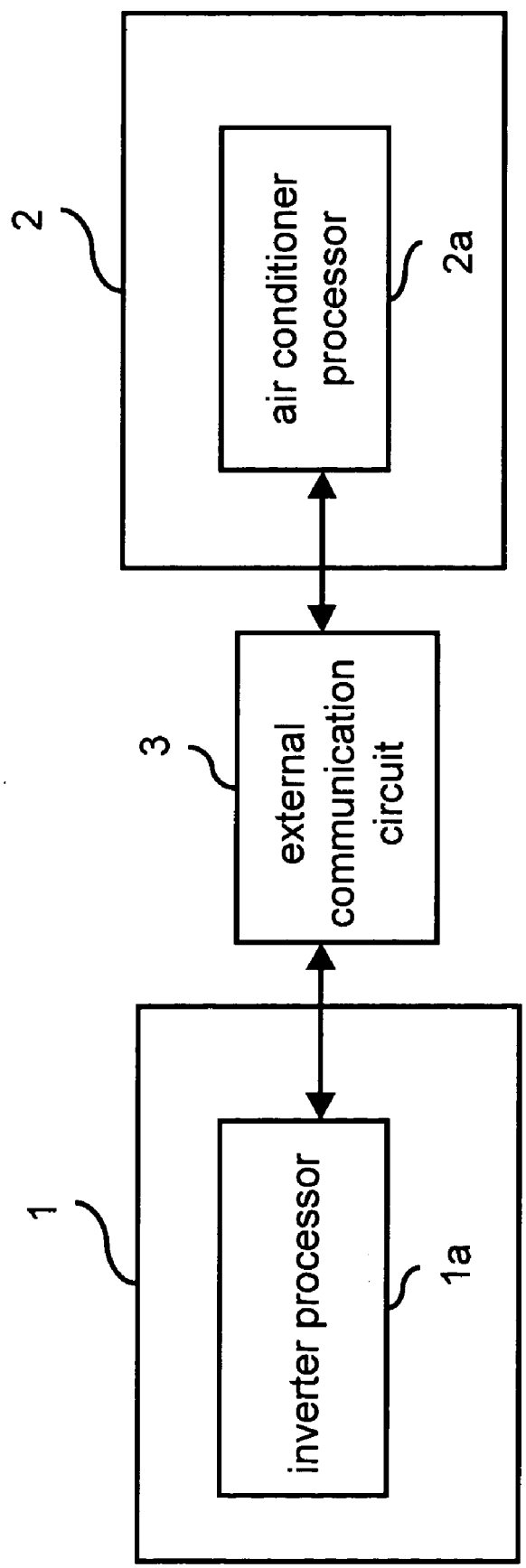
FIG. 1 is a system block diagram of the prior art.
Figure 2:
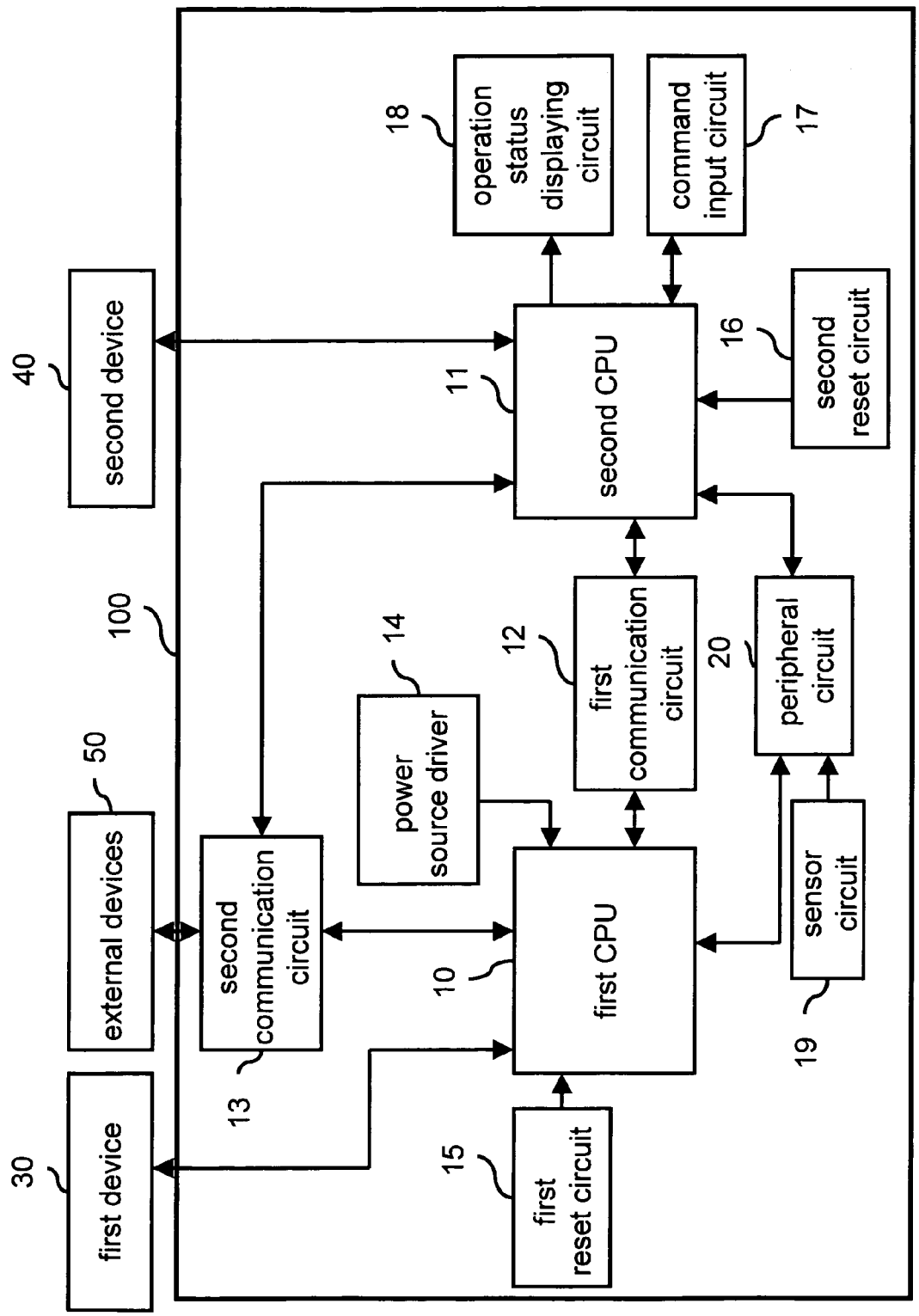
FIG. 2 is a system block diagram of the invention.

FIG. 2 is a system block diagram of the invention. The following explanation uses the HVAC system as an example. The HVAC system includes: a first CPU 10, a second CPU 11, a first communication circuit 12, a second communication circuit 13, a power source driver 14, a first reset circuit 15, a second reset circuit 16, a command input circuit 17, an operation status displaying circuit 18, a sensor circuit 19, and a peripheral circuit 20.

The circuit substrate 100 is a printed circuit board (PCB). The required circuit is formed by chemical etching to accommodate various circuit elements. The types of the circuit substrate 100 include compound substrates, ceramic substrate, metal substrates, thermo-plastic substrates, and glass fabric copper foil substrates.

The first CPU 10 is disposed on the circuit substrate 100 to receive the control signal and process computations for controlling the operations (e.g., start, stop, speed variation) a first device 30 (e.g., an inverter). It further executes the kernel of the first device 30, the peripheral control software, and the peripheral software of the second device 40.

The second CPU 11 is disposed on the circuit substrate 100. It communicates with the first CPU 10 via the first communication circuit 12, receives the control signal and processes computations for controlling the operations (e.g., start, stop, speed variation) of the second device (e.g., an air conditioner). It further executes the peripheral software of the first device 30 and the second device 40.

The first communication circuit 12 is disposed on the circuit substrate 100 to enable the communications between the first CPU 10 and the second CPU 11. The first communication circuit 12 includes an isolated synchronous/asynchronous serial communication port, a photo coupler, a fiber circuit or isolated transformer. The communications are done using the isolated communication circuit to reduce the noise interference.

The second communication circuit 13 is disposed on the circuit substrate 100, coupling to the first CPU 10 and the second CPU 11, respectively, to provide the communications between the first CPU 10 or the second CPU 11 and external devices 50 (e.g., a remote computer). Such a remote control uses, for example, the serial communication interface standard RS-232 or RS-485.

The power source driver 14 is disposed on the circuit substrate 100, coupling to the first CPU 10. It converts the power (e.g., AC/DC conversions) for providing the power required for the operation of the first CPU 10.

The first reset circuit 15 is disposed on the circuit substrate 100, coupling to the first CPU 10. When the HVAC system restarts its operation, the first reset circuit 15 generates a reset signal to initialize the processing status of the first CPU 10.

The second reset circuit 16 is disposed on the circuit substrate 100, coupling to the second CPU 11. When the HVAC system restarts its operation, the second reset circuit 16 generates a reset signal to initialize the processing status of the second CPU 11.

The command input circuit 17 is disposed on the circuit substrate 100, coupling to the second CPU 11 for entering an operation control command and generating the control signal corresponding to the operation control command. The first device 30 or the second device 40 operates according to the control signal. The command input circuit 16 can be combined with a human-machine operating interface for the user to manipulate.

The operation status displaying circuit 18 is disposed on the circuit substrate 100, coupling to the second CPU 11 for displaying the operation status or disorder message of the first device 30 and the second device 40. It may include several LED circuits, a seven-stroke display or LCD, and their drivers.

The sensor circuit 19 is disposed on the circuit substrate 100, coupling to the first CPU 10 and the second CPU 11. The operation statuses of the first device 30 and the second device 40 along with the temperature or moisture of the environment are detected by a sensor (not shown). The corresponding detection signal is generated and sent to the first CPU 10 and the second CPU 11 for operations related to monitoring the operations of the first and second device 30, 40.

The peripheral circuit 20 is disposed on the circuit substrate 100, coupling to the first CPU 10 and the second CPU 11 for performing control, converting the detection signal, and processing inputs and outputs on the first CPU 10 and the second CPU 11. The peripheral circuit 20 includes an ADC, a DAC, an I/O port, a timer, and a counter. By sharing the peripheral circuit 19, the invention can save circuit elements and reduce the production cost of the control device.

Moreover, the embodiment disclosed herein has the following advantages:

1. The peripheral circuit of the processors and the peripheral software communicate via a communication circuit and support each other. (One may use independent peripheral circuits and control software, too.)

2. The kernel processor and the primary system of the power supply can be connected to the ground together. (The two processors can be disposed together at the secondary system of the power supply.) An isolated or non-isolated power source driver and protection circuit can be selectively used.

3. The processor on the client end and the human-machine interface are isolated from the primary circuit (i.e., the first CPU related circuit) of the primary system of the power supply. There is no danger of high-voltage shock.

4. The kernel processor (i.e., the first CPU) and the client processor (i.e., the second CPU) communicate with each other via an isolated circuit, such as the photo coupler, the isolated transformer, or the fiber circuit, to reduce noise interference.

5. The two processors can individually communicate with an external device using a second communication circuit for control operations.

Using the control with two processors, the processors of the first device and the second device and the peripheral circuit are integrated on the same circuit board to, along with the corresponding control software, control the operations of the first and second devices. This can effectively reduce the circuit size of the control device and its production cost.

The invention being thus described, it will be obvious that the same may be varied in many ways. Such variations are not to be regarded as a departure from the spirit and scope he invention, and all such modifications as would be obvious to one skilled in the art are covered by the claims claimed thereinafter.

What is claimed is:

1. A control device with two processors, comprising:
   a circuit substrate;
   a first central processing unit (CPU) disposed on the circuit substrate to receive a control signal for controlling the operation of a first device;
   a second CPU disposed on the circuit substrate to receive the control signal for controlling the operation of a second device;
   a first reset circuit, which generates a reset signal for initializing the operation status of the first CPU;

a second reset circuit, which generates a reset signal for initializing the operation status of the second CPU;

a power source driver, which converts a power supply standard to provide the power required for the operation of the first CPU;

a command input circuit, which is used to enter an operation control command and to generate the control signal;

an operation status displaying circuit, which displays the operation statuses of the first device and the second device;

a sensor circuit, which detects the operation statuses of the first device and the second device and the temperature and moisture of its environment and generates a corresponding detection signal;

a peripheral circuit, which processes conversion, input, and output on the control signal and the detection signal of the first CPU and the second CPU; and a first communication circuit disposed between the first CPU and the second CPU for them to communicate with each other, wherein the firs CPU executes kernel control software, peripheral software of the first device and peripheral software of the second device, the second CPU executes the peripheral software of the first device and the peripheral software of the second device, thereby controlling the operations of the first device and the second device.

2. The control device of claim 1, wherein the first device is an inverter.

3. The control device of claim 1, wherein the second device is an air conditioner.

4. The control device of claim 1 further comprising a second communication circuit for the first CPU and the second CPU to communicate with an external device for performing a remote control operation.

5. The control device of claim 1, wherein the operation status displaying circuit contains a plurality of light-emitting diodes (LED's).

6. The control device of claim 1, wherein the operation status displaying circuit contains a seven-stroke display.

7. The control device of claim 1, wherein the operation status displaying circuit contains a liquid crystal display (LCD).

8. The control device of claim 1, wherein the peripheral circuit includes: an analog-to-digital circuit (ADC), a digital-to-analog converter (DAC), an input/output (I/O) port, a timer, and a counter.

9. The control device of claim 1, wherein the first communication circuit consists of an isolated synchronous/asynchronous serial communication port.

10. The control device of claim 9, wherein the first communication circuit contains a photo coupler.

11. The control device of claim 9, wherein the first communication circuit contains a fiber circuit.

12. The control device of claim 9, wherein the first communication circuit contains an isolated transformer.

* * * * *